(12) United States Patent
Okubo et al.

(10) Patent No.: US 10,771,000 B2
(45) Date of Patent: Sep. 8, 2020

(54) MOTOR CONTROL SYSTEM, MOTOR CONTROL APPARATUS, AND METHOD FOR CONTROLLING MOTOR

(71) Applicant: Kabushiki Kaisha Yaskawa Denki, Kitakyushu-shi (JP)

(72) Inventors: Tadashi Okubo, Kitakyushu (JP); Yusuke Oka, Kitakyushu (JP); Atsunobu Sakata, Kitakyushu (JP); Hiroyuki Murakami, Kitakyushu (JP); Daichi Horimai, Kitakyushu (JP)

(73) Assignee: Kabushiki Kaisha Yaskawa Denki, Kitakyushu-shi (JP)

( * ) Notice: Subject to any disclaimer, the term of this patent is extended or adjusted under 35 U.S.C. 154(b) by 0 days.

(21) Appl. No.: 15/729,226

(22) Filed: Oct. 10, 2017

(65) Prior Publication Data

US 2018/0102724 A1     Apr. 12, 2018

(30) Foreign Application Priority Data

Oct. 11, 2016   (JP) ................................ 2016-199895

(51) Int. Cl.
*H02P 6/17*   (2016.01)
*B30B 15/00*   (2006.01)
(Continued)

(52) U.S. Cl.
CPC .......... *H02P 27/08* (2013.01); *B30B 15/0094* (2013.01); *G05B 15/02* (2013.01);
(Continued)

(58) Field of Classification Search
CPC ........ H02P 27/08; H02P 6/17; H02P 2205/05; G05B 15/02; B30B 15/0094;
(Continued)

(56) References Cited

U.S. PATENT DOCUMENTS

| 5,425,906 A | * | 6/1995 | Hashimoto | ............. | B29C 45/77 |
| | | | | | 264/328.1 |
| 2005/0216216 A1 | * | 9/2005 | Shimada | ................ | G01K 1/022 |
| | | | | | 702/79 |

(Continued)

FOREIGN PATENT DOCUMENTS

JP         08-241111 A     9/1996
JP      2000-324880 A    11/2000
(Continued)

OTHER PUBLICATIONS

Peter Nachtwey, Redundant Sensors Improve Precision and Reliability, [online], Aug. 2014, [retrieved on Nov. 20, 2018]. Retrieved from <https://www.techbriefs.com/component/content/article/moco/features/20190> (Year: 2014).*

(Continued)

*Primary Examiner* — Thomas C Lee
*Assistant Examiner* — Charles Cai
(74) *Attorney, Agent, or Firm* — Oblon, McClelland, Maier & Neustadt, L.L.P.

(57) ABSTRACT

A motor control system includes a motor, a motor control apparatus that drives the motor and includes a first communication port and a second communication port, an upper-level control apparatus connected to the first communication port via a first communication path, an interface connected to the second communication port via a second communication path, and one or more detectors that detect information for controlling the motor and are connected to or including the interface. The motor control apparatus includes processing circuitry that obtains the information detected by the detector and exchanged between the upper-level control apparatus and the interface, and controls the motor based on the obtained information.

18 Claims, 6 Drawing Sheets

(51) Int. Cl.
*G05B 15/02* (2006.01)
*G01L 15/00* (2006.01)
*H02P 27/08* (2006.01)
*G01L 9/00* (2006.01)

(52) U.S. Cl.
CPC ........... *H02P 6/17* (2016.02); *B60L 2240/423* (2013.01); *B60L 2240/429* (2013.01); *B60L 2260/42* (2013.01); *B60L 2260/44* (2013.01); *G01L 9/0052* (2013.01); *G01L 15/00* (2013.01); *H02P 2205/05* (2013.01); *Y02T 10/642* (2013.01); *Y02T 90/16* (2013.01)

(58) Field of Classification Search
CPC .. Y02T 10/642; Y02T 90/16; B60L 2240/423; B60L 2260/44; B60L 2260/42; B60L 2240/429; G01L 15/00; G01L 9/0052
See application file for complete search history.

(56) References Cited

U.S. PATENT DOCUMENTS

| | | | | |
|---|---|---|---|---|
| 2007/0084264 A1* | 4/2007 | Iwashita | ................ | B21D 24/02 72/350 |
| 2008/0197797 A1* | 8/2008 | El-Ibiary | ................ | H02K 11/33 318/567 |
| 2009/0025444 A1* | 1/2009 | Suzuki | ................... | B21D 24/02 72/16.1 |
| 2011/0190593 A1* | 8/2011 | McNair | .................... | A61B 5/00 600/300 |
| 2014/0084838 A1* | 3/2014 | Horiguchi | ............... | H02P 31/00 318/560 |
| 2016/0263854 A1* | 9/2016 | Suzuki | ................... | B30B 15/26 |

FOREIGN PATENT DOCUMENTS

| | | |
|---|---|---|
| JP | 2008-126294 A | 6/2008 |
| JP | 2009-023185 A | 2/2009 |
| JP | 2010-025889 A | 2/2010 |
| JP | 2015-220825 A | 12/2015 |

OTHER PUBLICATIONS

Office Action dated Jul. 24, 2017, in Japanese Patent Application No. 2016-199895, filed Oct. 11, 2016 (with English-language Translation).

* cited by examiner

MOTOR CONTROL SYSTEM, MOTOR CONTROL APPARATUS, AND METHOD FOR CONTROLLING MOTOR

CROSS-REFERENCE TO RELATED APPLICATIONS

The present application claims priority under 35 U.S.C. § 119 to Japanese Patent Application No. 2016-199895, filed Oct. 11, 2016. The contents of this application are incorporated herein by reference in their entirety.

BACKGROUND

Field of the Invention

The embodiments disclosed herein relate to a motor control system, a motor control apparatus, and a method for controlling a motor.

Discussion of the Background

JP8-241111A1 discloses a drive control system that includes a drive control command unit, a plurality of drive control units, and an interface into which detection signals are input from a plurality of sensors. The drive control command unit, the plurality of drive control units, and the interface are connected to each other through a network.

SUMMARY

According to one aspect of the present invention, a motor control system includes a motor, a motor control apparatus that drives the motor and includes a first communication port and a second communication port, an upper-level control apparatus connected to the first communication port via a first communication path, an interface connected to the second communication port via a second communication path, and one or more detectors that detect information for controlling the motor and are connected to or including the interface. The motor control apparatus includes processing circuitry that obtains the information detected by the detector and exchanged between the upper-level control apparatus and the interface, and controls the motor based on the obtained information.

According to another aspect of the present invention, a motor control apparatus for driving a motor includes a first communication port connected, via a first communication path, to an upper-level control apparatus, a second communication port connected, via a second communication path, to an interface that is connected to or included in one or more detectors that detect information for controlling the motor, and processing circuitry that obtains the information detected by the detector and exchanged between the upper-level control apparatus and the interface, and controls the motor based on the obtained information.

According to yet another aspect of the present invention, a method for controlling a motor includes obtaining information for controlling a motor, and controlling the motor based on the information. The information is detected by one or more detectors and exchanged between an upper-level control apparatus and an interface connected to or included in the detector, and the method is executed by processing circuitry of a motor control apparatus that controls the motor.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
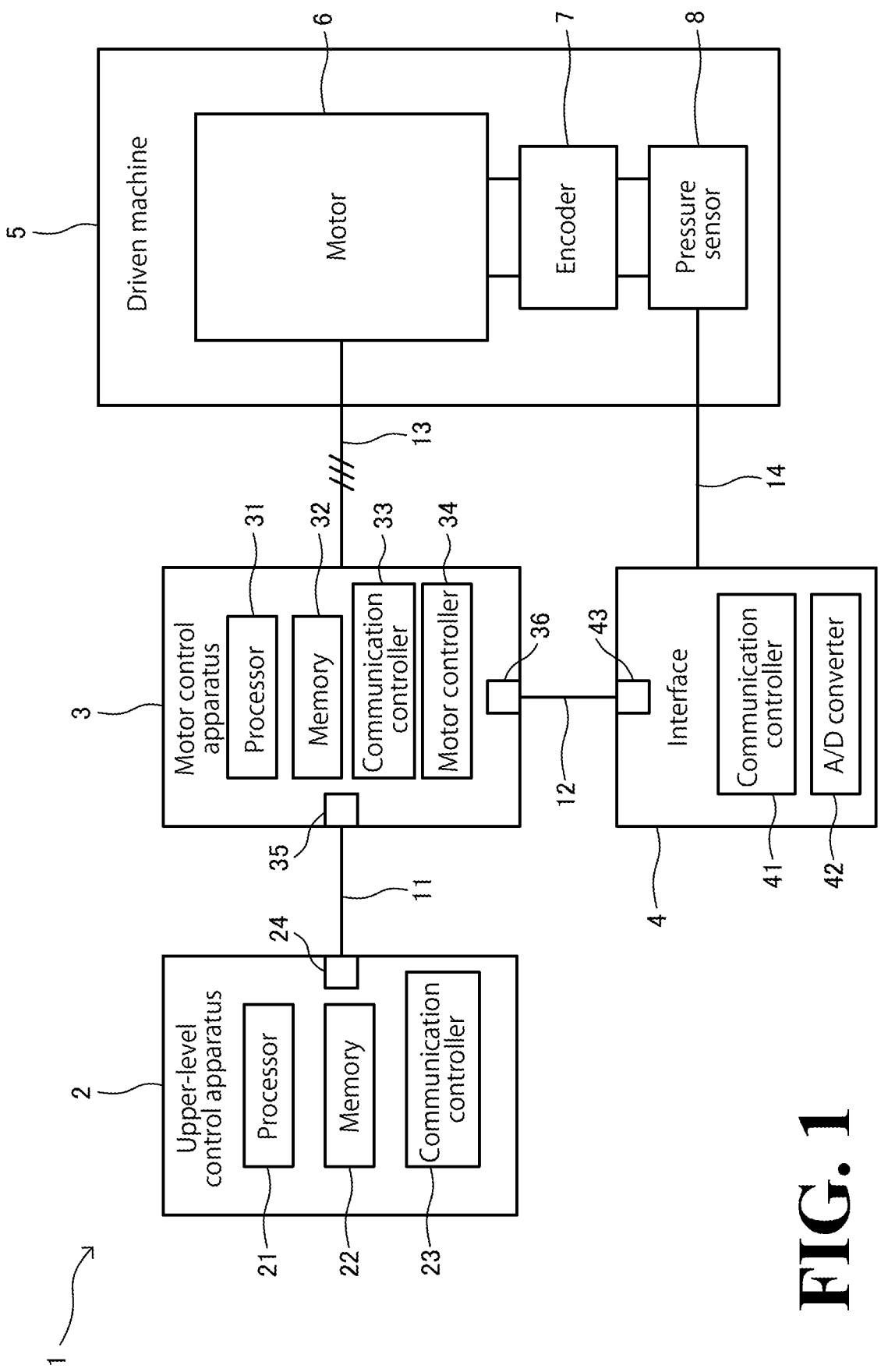
FIG. 1 is a diagram illustrating a general arrangement of a motor control system according to an embodiment.

The embodiments will now be described with reference to the accompanying drawings, wherein like reference numerals designate corresponding or identical elements throughout the various drawings.

1. General Arrangement of Motor Control System

By referring to FIG. 1, a general arrangement of a motor control system 1 according to this embodiment will be described.

As illustrated in FIG. 1, the motor control system 1 includes elements such as an upper-level control apparatus 2, a motor control apparatus 3, an interface 4, and a driven machine 5. The driven machine 5 includes elements such a motor 6, an encoder 7, and a pressure sensor 8.

The upper-level control apparatus 2 controls the operation of the entirety of the motor control system 1. For example, the upper-level control apparatus 2 sends a command to the motor control apparatus 3 at a predetermined timing, or sends and receives information detected by the pressure sensor 8 to and from the interface 4 through the motor control apparatus 3. The upper-level control apparatus 2 includes elements such as a processor 21, a memory 22, a communication controller 23, and a communication port 24.

The processor 21 is a control-purpose integrated circuit, examples including, but not limited to, a central processing unit (CPU) and a micro-controller. The processor 21 includes a random access memory (RAM) for working purposes, not illustrated. The memory 22 is an information recording medium. Specifically, the memory 22 is a non-volatile memory such as a read-only memory (ROM), an electrically erasable and programmable ROM (EEPROM), a flash memory, and a hard disc. The memory 22 stores programs and various kinds of data.

The communication controller 23 is a communication-purpose integrated circuit and is made up of, for example, an application specific integrated circuit constructed for specific applications, such as an application specific integrated circuit (ASIC) and a field-programmable gate array (FPGA). The communication port 24 is a communication interface for the upper-level control apparatus 2 to communicate with the motor control apparatus 3 through a first communication path 11.

The motor control apparatus 3 outputs current and voltage to the motor 6 so as to drive the motor 6. The motor control apparatus 3 includes elements such as a processor 31 (which is a non-limiting example of the arithmetic and/or logic unit recited in the appended claims), a memory 32, a communication controller 33, a motor controller 34, a first communication port 35, and a second communication port 36.

The processor 31, the memory 32, and the communication controller 33 are respectively similar in hardware configuration to the processor 21, the memory 22, and the communication controller 23. The motor controller 34 outputs current and voltage to the motor 6 through a motor output line 13. The first communication port 35 is a communication interface for the motor control apparatus 3 to communicate with the upper-level control apparatus 2 through the first communication path 11. The second communication port 36 is a communication interface for the motor control apparatus 3 to communicate with the interface 4 through a second communication path 12.

The interface 4 is an input-output unit that connects the pressure sensor 8 to the motor control apparatus 3. The interface 4 includes elements such as a communication controller 41, an analog-to-digital (A/D) converter 42, and a communication port 43.

The communication controller 41 is similar in hardware configuration to the communication controllers 23 and 33. The A/D converter 42 receives analogue information detected by and input from the pressure sensor 8 through a signal line 14, and converts the information into digital information. The communication port 43 is a communication interface for the interface 4 to communicate with the motor control apparatus 3 through the second communication path 12.

The driven machine 5 is a machine that needs to be pressure-controlled. Examples of the driven machine 5 include, but are not limited to, a press machine, a mold device, and a compressor. The driven machine 5 is driven by the motor 6. The motor 6 may be a rotational motor or a linear motor. While in FIG. 1 the driven machine 5 includes a single motor 6, the driven machine 5 may include a plurality of motors 6. In this case, the single motor control apparatus 3 may control the plurality of motors 6.

The encoder 7 detects the position (rotational angle) of the motor 6 and sends the detected position to the motor control apparatus 3 in the form of, for example, a pulse signal. The encoder 7 may be an optical encoder or a magnetic encoder. It will be understood that the encoder 7 may be replaced with any other detector, such as a resolver, that is capable of detecting the rotational angle of the motor 6. When the motor 6 is a linear motor, the encoder 7 may be a linear encoder.

The pressure sensor 8 (which is a non-limiting example of the at least one detector recited in the appended claims) is a sensor that detects the pressure (which is a non-limiting example of the information for controlling the motor 6 recited in the appended claims) of the driven machine 5. For example, when the driven machine is a press machine, the pressure sensor 8 detects the pressure of a pressing plate (not illustrated) that presses an object. A non-limiting example of the pressure sensor 8 is a strain gauge. The pressure sensor 8 sends the detected information to the interface 4.

The first communication path 11 and the second communication path 12 are network wires compliant with common communications standards. Each of the first communication path 11 and the second communication path 12 may be a half-duplex communication path or a full-duplex communication path. The first communication path 11 connects the communication port 24 of the upper-level control apparatus 2 and the first communication port 35 of the motor control apparatus 3 to each other. The second communication path 12 connects the second communication port 36 of the motor control apparatus 3 and the communication port 43 of the interface 4 to each other. Thus, the upper-level control apparatus 2, the motor control apparatus 3, and the interface 4 are connected in series to each other through the first communication path 11 and the second communication path 12. It will be understood that the first communication path 11 and the second communication path 12 each may include a repeater such as a hub somewhere along the communication path.

The first communication path 11 is for the upper-level control apparatus 2 to send a command to the motor control apparatus 3 and for the motor control apparatus 3 to send to the upper-level control apparatus 2 information such as a result of controlling the motor 6 and the information detected by the pressure sensor 8. The second communication path 12 is for the upper-level control apparatus 2 and the motor control apparatus 3 to send to the interface 4 a signal demanding the information detected by the pressure sensor 8 and for the interface 4 to send to the motor control apparatus 3 information such as the information detected by the pressure sensor 8. These pieces of information, such as the information detected by the pressure sensor 8, are exchanged between the upper-level control apparatus 2 and the interface 4 through the first communication path 11 and the second communication path 12. In this respect, the communication controller 33 of the motor control apparatus 3 functions as an information repeater or relay that repeats or relays information such as the information detected by the pressure sensor 8.

Figure 6:
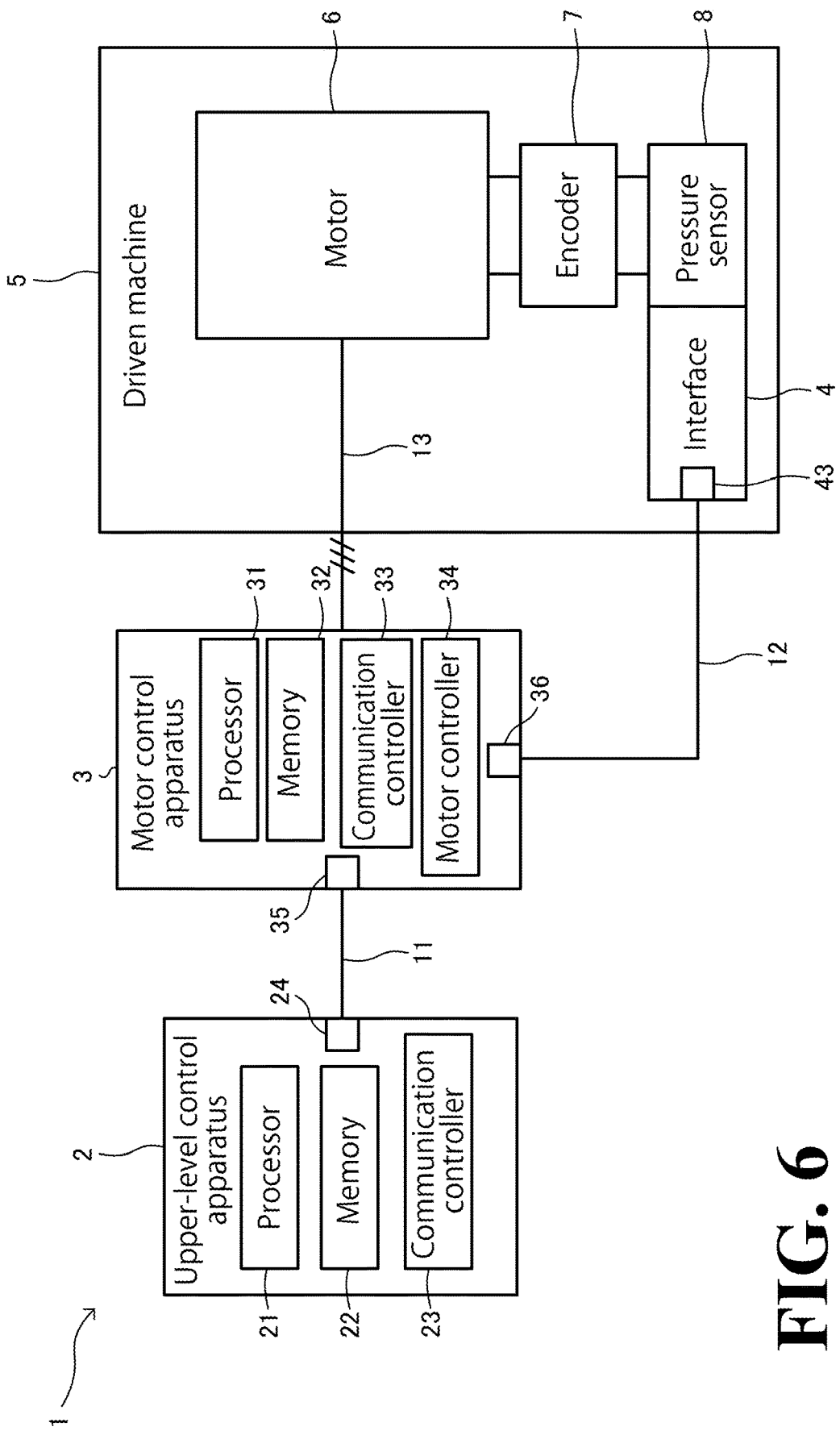
FIG. 6 is a diagram illustrating a general arrangement of a motor control system according to a modification in which a pressure sensor includes an interface integral to the pressure sensor.

It will be understood that the above-described configuration of the motor control system 1 is provided for exemplary purposes only and is not intended in a limiting sense. In another possible embodiment, as illustrated in FIG. 6, described later, the interface 4 may be integral to the pressure sensor 8. In still another possible embodiment, the encoder 7 may not necessarily be provided.

2. Configuration (Pressure Full-Closed Control) of Motor Control Apparatus

By referring to FIG. 2, description will be made with regard to a functional configuration of the motor control apparatus 3 associated with pressure full-closed control. Same reference numerals indicate same or similar features in FIGS. 1 and 2, and all or some of the features will not be elaborated upon here.

Figure 2:
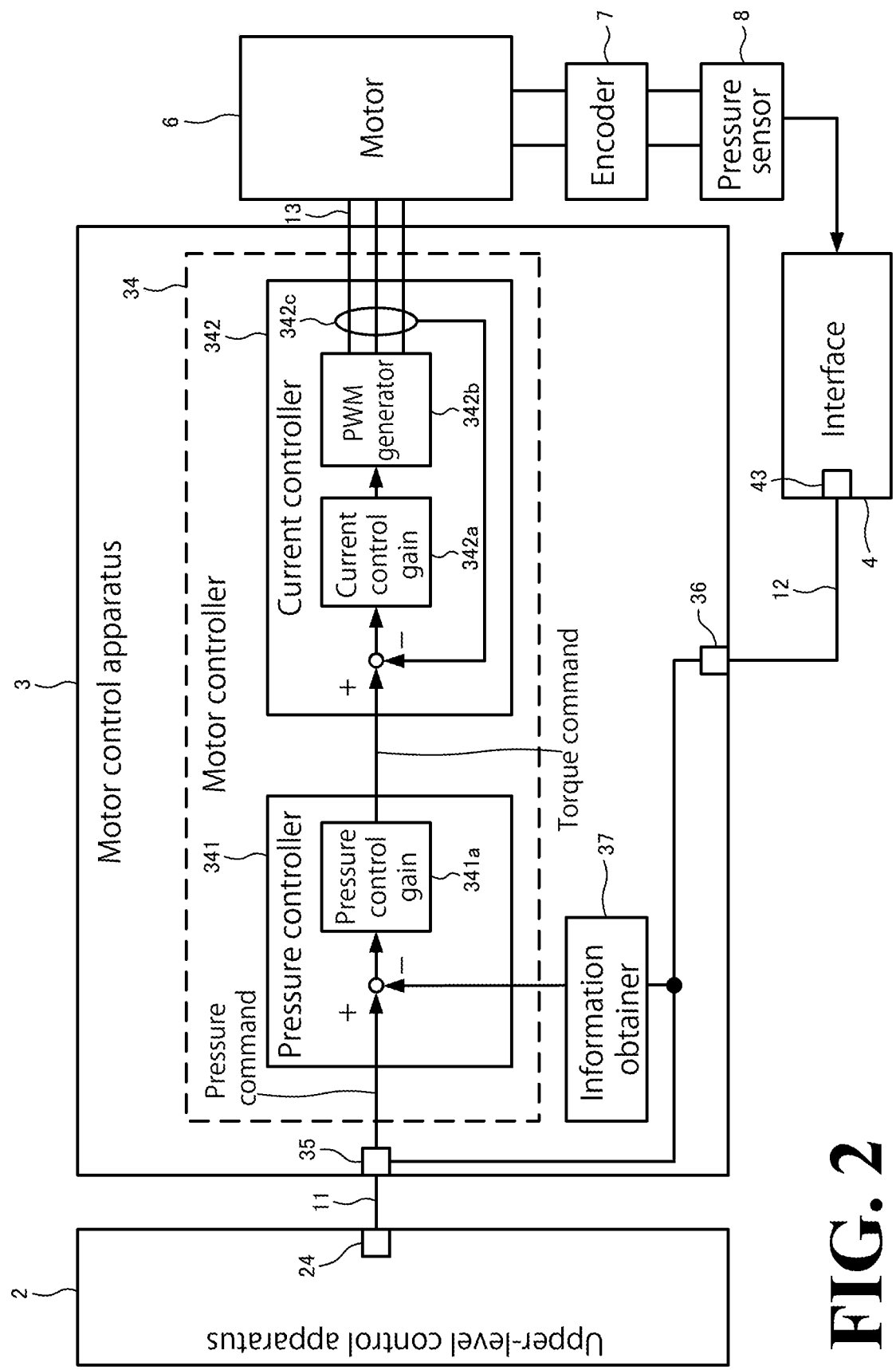
FIG. 2 is a diagram illustrating a functional configuration of a motor control apparatus according to the embodiment associated with pressure full-closed control.

As illustrated in FIG. 2, the motor control apparatus 3 includes elements such as the motor controller 34 and an information obtainer 37. The information obtainer 37 obtains, from among the information exchanged between the upper-level control apparatus 2 and the interface 4, the information detected by the pressure sensor 8. That is, the motor control apparatus 3 uses a function of the communication controller 33 to repeat or relay the information exchanged between the upper-level control apparatus 2 and the interface 4, and at the same time uses a function of the information obtainer 37 to monitor the information and obtain necessary information (in this embodiment, the information detected by the pressure sensor 8).

The motor controller 34 controls the motor 6 based on the information obtained by the information obtainer 37. The motor controller 34 includes elements such as a pressure controller 341 and a current controller 342.

The pressure controller 341 includes elements such as a pressure control gain 341a. The pressure control gain 341a receives an error between a pressure command sent from the upper-level control apparatus 2 and the information detected by the pressure sensor 8 and obtained by the information obtainer 37. Then, the pressure control gain 341a subjects the error to predetermined signal processing to generate and output a torque command.

The current controller 342 includes elements such as a current control gain 342a, a pulse width modulation (PWM) generator 342b, and a current detector 342c. The current control gain 342a receives an error between a torque command output from the pressure controller 341 and information detected by the current detector 342c. Then, the current control gain 342a subjects the error to predetermined signal processing to generate and output a current command. The PWM generator 342b generates a PWM gate signal based on the current command. Based on the generated PWM gate signal, the motor control apparatus 3 outputs current and voltage to the motor 6 from an inverter of the motor control apparatus 3, not illustrated, through the motor output line 13.

With this configuration, the motor control apparatus 3 performs "pressure full-closed control", which is to control the motor 6 based on the pressure command sent from the upper-level control apparatus 2 and based on feedback information from the pressure sensor 8.

It will be understood that instead of feedback of the information detected by the pressure sensor 8, it is possible to employ more common torque control implemented by, for example, a switching operation by a user or automatic switching effected by setting parameters. In this case, the motor control apparatus 3 performs semi-closed control based on a torque command sent from the upper-level control apparatus 2 and based on the information detected by the current detector 342c.

It will also be understood that the above-described configuration of the motor control apparatus 3 is provided for exemplary purposes only and is not intended in a limiting sense. For example, the motor control apparatus 3 may include a position controller that performs position control based on a position command sent from the upper-level control apparatus 2 and based on information detected by the encoder 7.

In another possible embodiment, the processings performed by the above-described elements such as the pressure controller 341, the current controller 342, and the information obtainer 37 may be performed by a smaller number of processing elements (for example, a single processing element) or by a larger number of processing elements. In still another possible embodiment, the inverter and other function(s) of the motor control apparatus 3 associated with feeding of driving power to the motor 6 may be mounted on or in a tangible device or devices, while other functions of the motor control apparatus 3 may be implemented by a program executed by the processor 31. In still another possible embodiment, the elements such as the pressure controller 341, the current controller 342, and the information obtainer 37 may be partially or entirely implemented by a tangible device or devices such as an application specific integrated circuit (ASIC), a field-programmable gate array (FPGA), and other electric circuit.

3. Configuration (Switching Between Speed Control and Pressure Control) of Motor Control Apparatus The motor control apparatus 3 is capable of performing speed control, in addition to the above-described pressure control. Specifically, the motor control apparatus 3 is capable of automatic switching between speed control and pressure control by setting parameters. By referring to FIG. 3, description will be made with regard to a functional configuration of the motor control apparatus 3 associated with the automatic switching between speed control and pressure control. Same reference numerals indicate same or similar features in FIGS. 2 and 3, and all or some of the features will not be elaborated upon here.

Figure 3:
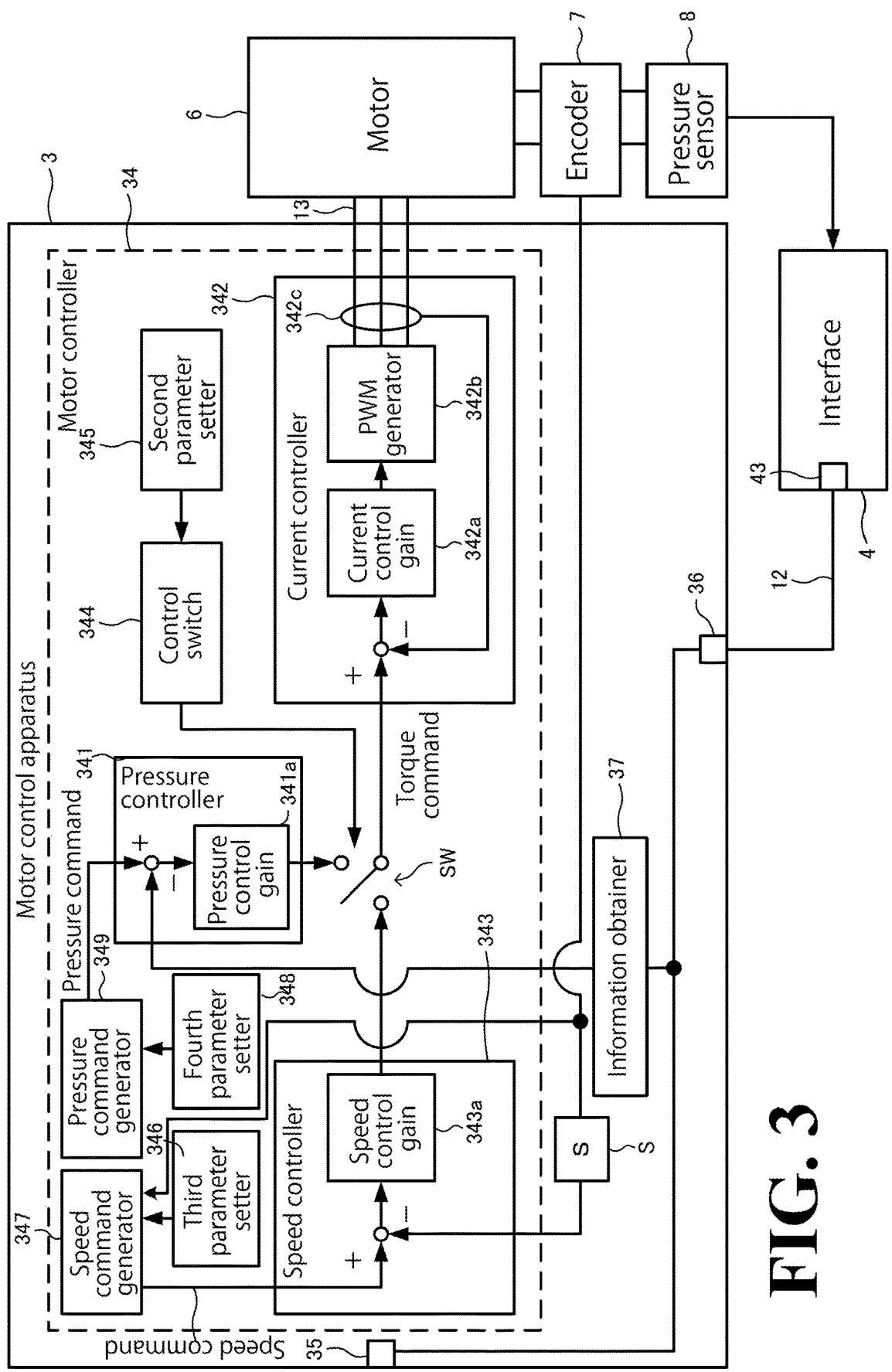
FIG. 3 is a diagram illustrating a functional configuration of the motor control apparatus associated with automatic switching between speed control and pressure control.

As illustrated in FIG. 3, the motor controller 34 of the motor control apparatus 3 includes, in addition to the pressure controller 341 and the current controller 342, elements such as a speed controller 343, a switch SW, a control switch 344, a second parameter setter 345, a third parameter setter 346, a speed command generator 347, a fourth parameter setter 348, and a pressure command generator 349.

The speed controller 343 includes elements such as a speed control gain 343a. The speed control gain 343a receives an error between a speed command generated by the speed command generator 347 and speed information of the motor 6 obtained by differentiating, at a differentiator S, the information detected by the encoder 7 (which is a pulse signal indicating the rotational angle of the motor 6). Then, the speed control gain 343a subjects the error to predetermined signal processing to generate and output a torque command.

The switch SW switches between the torque command from the pressure controller 341 and the torque command from the speed controller 343 to be input into the current controller 342. It will be understood that the switch SW may be configured as hardware or software. The control switch 344 controls the switch SW to switch between the speed control performed by the speed controller 343 and the pressure control performed by the pressure controller 341. The second parameter setter 345 sets, as a parameter or parameters, a switching condition(s) under which the control switch 344 controls the switch SW. Examples of the switching conditions set by the second parameter setter 345 include, but are not limited to, switching pressure (value of the pressure detected by the pressure sensor 8) and switching position (value of the pulse signal detected by the encoder 7). One or both of the switching pressure and the switching position may be set as a parameter or parameters.

The third parameter setter 346 sets, as parameters, a plurality of speed setting values and switching conditions respectively corresponding to the plurality of speed setting values. Specifically, the third parameter setter 346 sets speed setting values in, for example, a maximum of 10 levels, and sets, for example, switching positions (values of the pulse signal detected by the encoder 7) as the switching conditions for the 10 levels of speed setting values. The memory 32 of the motor control apparatus 3 stores in advance predetermined waveform data (table) of the speed command, and the speed command generator 347 generates a speed command based on the waveform data and a parameter(s) set by the third parameter setter 346.

The fourth parameter setter 348 sets, as parameters, a plurality of pressure setting values and switching conditions respectively corresponding to the plurality of pressure setting values. Specifically, the fourth parameter setter 348 sets pressure setting values in, for example, a maximum of 5 stages, and sets, for example, switching time as the switching conditions for the 5 levels of pressure setting values. The memory 32 of the motor control apparatus 3 stores in advance predetermined waveform data (table) of the pressure command, and the pressure command generator 349 generates a pressure command based on the waveform data and a parameter(s) set by the fourth parameter setter 348.

The pressure control gain 341a of the pressure controller 341 receives an error between the pressure command generated by the pressure command generator 349 and the information detected by the pressure sensor 8 and obtained by the information obtainer 37. Then, the pressure control gain 341a subjects the error to predetermined signal processing to generate and output a torque command.

With the above-described configuration, the motor control apparatus 3 performs automatic switching between speed control and pressure control based on various parameters set by a user, and performs speed control at a speed command of a desired waveform and pressure control at a pressure command of a desired waveform.

It will be understood that the pressure control may be the above-described pressure full-closed control, which is to control the motor 6 based on the pressure command and the feedback information from the pressure sensor 8, or may be the above-described torque control (semi-closed control) without feedback of the information detected by the pressure sensor 8.

In another possible embodiment, the processings performed by the above-described elements such as the speed controller 343, the speed command generator 347, the pressure command generator 349, the second parameter setter 345, the third parameter setter 346, and the fourth parameter setter 348 may be performed by a smaller number of processing elements (for example, a single processing element) or by a larger number of processing elements. In still another possible embodiment, the elements such as the speed controller 343, the speed command generator 347, the pressure command generator 349, the second parameter setter 345, the third parameter setter 346, and the fourth parameter setter 348 may be partially or entirely implemented by a tangible device or devices such as an application specific integrated circuit (ASIC), a field-programmable gate array (FPGA), and other electric circuit.

4. Parameter Setting in Switching Operation Between Speed Control and Pressure Control By referring to FIG. 4, parameter setting in the above-described automatic switching operation between speed control and pressure control will be described.

Figure 4:
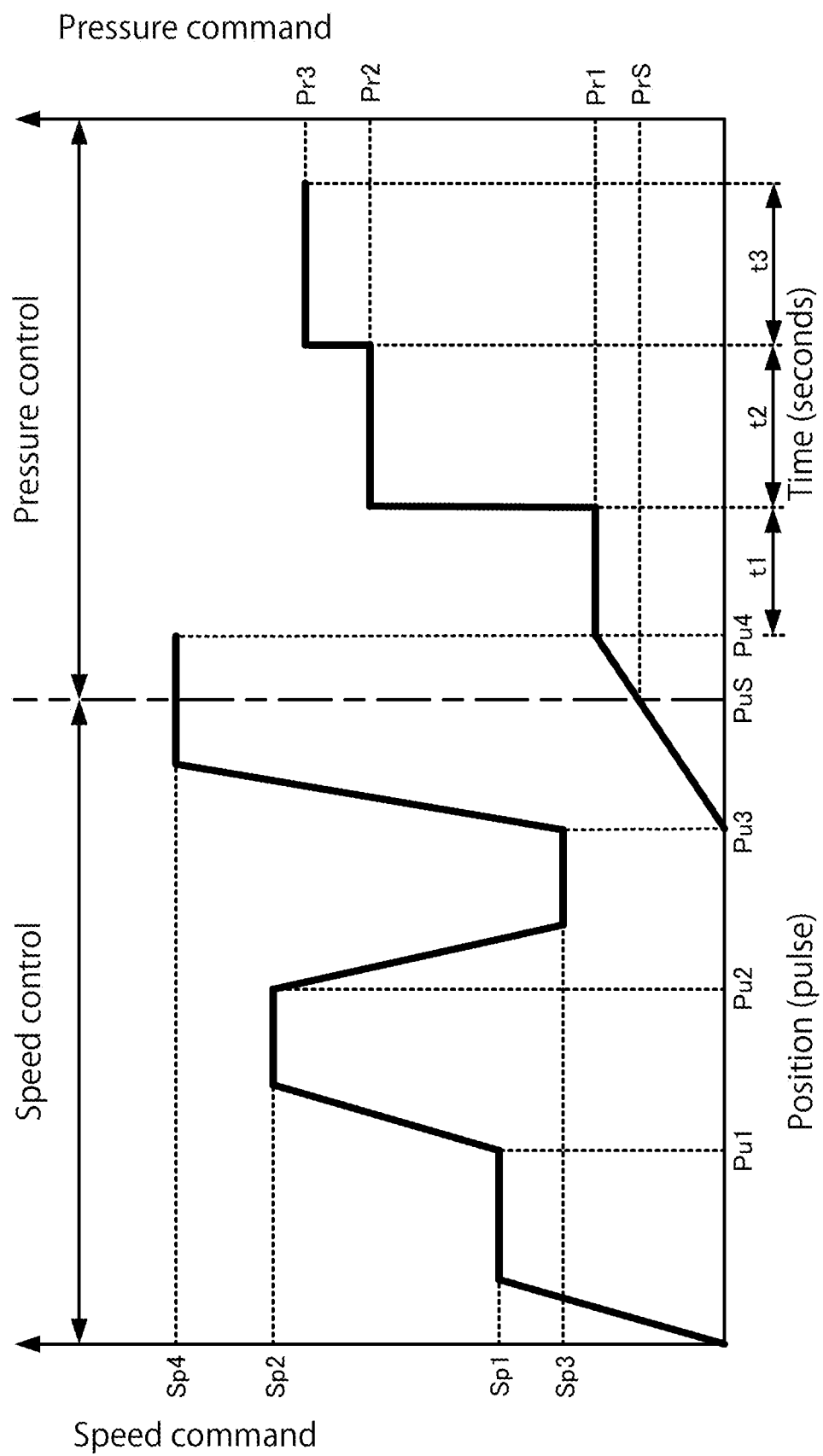
FIG. 4 illustrates setting of parameters associated with the motor control apparatus's automatic switching operation between speed control and pressure control.

In the embodiment of FIG. 4, the third parameter setter 346 sets, as parameters, four speed setting values Sp1 to Sp4 and positions Pu1 to Pu4 (expressed as pulses in this embodiment). The positions Pu1 to Pu4 are positions at which the output of the commands of the speed setting values Sp1 to Sp4 is completed. Each of the speed setting values Sp1 to Sp4 is output until the position detected by the encoder 7 reaches the position, among Pu1 to Pu4, corresponding to the speed setting value, and then the speed setting value is switched to the next speed setting value. The acceleration and deceleration at the time of the switching are set at predetermined values in advance.

Also in the embodiment of FIG. 4, the second parameter setter 345 sets, as a parameter or parameters, one or both of switching pressure PrS (value of the pressure detected by the pressure sensor 8) and switching position PuS (value of the pulse signal detected by the encoder 7). The switching pressure PrS and the switching position PuS are switching conditions under which speed control and pressure control are switched from each other. When the switching pressure PrS is set, the control switch 344 switches the speed control to the pressure control when the value of the pressure detected by the pressure sensor 8 reaches the switching pressure PrS. When the switching position PuS is set, the control switch 344 switches the speed control to the pressure control when the position detected by the encoder 7 reaches the switching position PuS. When both the switching pressure PrS and the switching position PuS are set, the control switch 344 switches the speed control to the pressure control when the value of the pressure detected by the pressure sensor 8 reaches the switching pressure PrS and when the position detected by the encoder 7 reaches the switching position PuS. In the embodiment of FIG. 4, the above-described switching conditions are met while the speed setting value Sp4 is being output as a speed command, causing the speed control to be switched to the pressure control.

Also in the embodiment of FIG. 4, the fourth parameter setter 348 sets, as parameters, three pressure setting values Pr1 to Pr3 and times t1 to t3 (expressed as seconds in this embodiment). Each of the times t1 to t3 are the time at which the command of the corresponding pressure setting value, among Pr1 to Pr3, is output. Each of the pressure setting values Pr1 to Pr3 is output until the output time reaches the corresponding time, among the times t1 to t3, and then the pressure setting value is switched to the next pressure setting value.

It will be understood that the above-described parameter setting is provided for exemplary purposes only and is not intended in a limiting sense. In another possible embodiment, the number of speed setting values Sp may be equivalent to or less than three or equivalent to or more than five, and the number of pressure setting values Pr may be equivalent to or less than three or equivalent to or more than four. In still another possible embodiment, the acceleration and deceleration at the time of the switching of the speed setting values in the speed control may be set as parameters.

5. Advantageous Effects of the Embodiment

As has been described hereinbefore, in the motor control system 1 according to this embodiment, the upper-level control apparatus 2, the motor control apparatus 3, and the interface 4 are connected in series to each other through the communication paths. This configuration simplifies network wiring and makes connection management more efficient as compared with the case where the motor control apparatus 3 and the interface 4 are connected in parallel to the upper-level control apparatus 2.

This series connection in the system configuration, however, can cause a delay in the transmission of a detection signal of the pressure sensor 8 to the upper-level control apparatus 2. This is because the detection signal from the interface 4 passes through the motor control apparatus 3 before reaching the upper-level control apparatus 2.

In this embodiment, the motor control apparatus 3 includes the information obtainer 37 and the motor controller 34. The information obtainer 37 obtains the information detected by the pressure sensor 8 and exchanged between the upper-level control apparatus 2 and the interface 4. The motor controller 34 controls the motor 6 based on the information obtained by the information obtainer 37. The function of the information obtainer 37 enables the motor control apparatus 3 to obtain the detected information directly from the interface 4, without intervention by the upper-level control apparatus 2, so that the motor 6 is controlled based on the obtained information. This configuration, as a result, improves responsivity and controllability.

Assume an application in which an amplifier is provided in place of the interface 4 and an analogue signal from the amplifier is input into the motor control apparatus 3 (in this case, the motor control apparatus 3 includes an analog-to-digital (A/D) and associated elements). This application involves occurrences such as noise overriding the analogue signal and errors in the amplifier resulting from degradation over time of the amplifier. These occurrences may degrade the accuracy of pressure detection values, creating a possibility of vibration and/or abnormal noise. In this embodiment, employing the interface 4 enables the motor control apparatus 3 to obtain pressure detection values in the form of digital signals. The absence of an amplifier minimizes the influence of noise and eliminates the influence of degradation over time of the amplifier.

Also in this embodiment, the motor controller 34 of the motor control apparatus 3 includes the pressure controller 341. The pressure controller 341 controls the motor 6 based on a pressure command and the information detected by the pressure sensor 8 and obtained by the information obtainer 37. This configuration ensures pressure full-closed control, resulting in improved pressure control accuracy. This configuration also makes the motor control system 1 capable of performing compression control with improved speed and accuracy.

Also in this embodiment, the motor controller 34 of the motor control apparatus 3 includes the speed controller 343, the control switch 344, and the second parameter setter 345. The speed controller 343 controls the motor 6 based on a speed command and the speed of the motor 6. The control switch 344 switches between speed control performed by the speed controller 343 and pressure control performed by the pressure controller 341. The second parameter setter 345 sets, as a parameter or parameters, a switching condition(s) under which the control switch 344 switches between the speed control and the pressure control. With this configuration, when the driven machine 5 is a press machine, for example, the press machine is first subjected to speed control to make the pressing plate, not illustrated, of the press machine approach an object at a desired speed. Then, the speed control is automatically switched to pressure control to make the pressing plate perform pressing at a desired pressure. This configuration also improves user-friendliness because the user is able to more readily set, as parameters, switching conditions for switching between speed control and pressure control.

Also in this embodiment, the motor controller 34 of the motor control apparatus 3 includes the third parameter setter 346 and the speed command generator 347. The third parameter setter 346 sets, as parameters, a plurality of speed setting values Sp and switching conditions respectively corresponding to the plurality of speed setting values Sp. The speed command generator 347 generates a speed command based on at least one parameter among the parameters set by the third parameter setter 346. With this configuration, when the driven machine 5 is a press machine, for example, the pressing plate, not illustrated, of the press machine is speed-controlled to approach an object in a plurality of stages of speed. Thus, the speed control is implemented in meticulously segmented stages. This configuration also improves user-friendliness because the user is able to more readily set, as parameters, speed setting values Sp and switching conditions respectively corresponding to the speed setting values Sp.

Also in this embodiment, the motor controller 34 of the motor control apparatus 3 includes the fourth parameter setter 348 and the pressure command generator 349. The fourth parameter setter 348 sets, as parameters, a plurality of pressure setting values Pr and switching conditions respectively corresponding to the plurality of pressure setting values Pr. The pressure command generator 349 generates a pressure command based on at least one parameter among the parameters set by the fourth parameter setter 348. With this configuration, when the driven machine 5 is a press machine, for example, the pressing plate, not illustrated, of the press machine is pressure-controlled to press an object in a plurality of stages of pressure. Thus, the pressure control is implemented in meticulously segmented stages. This configuration also improves user-friendliness because the user is able to more readily set, as parameters, pressure setting values Pr and switching conditions respectively corresponding to the pressure setting values Pr.

6. Modifications

Modifications of the above-described embodiment will be described below.

Figure 5:
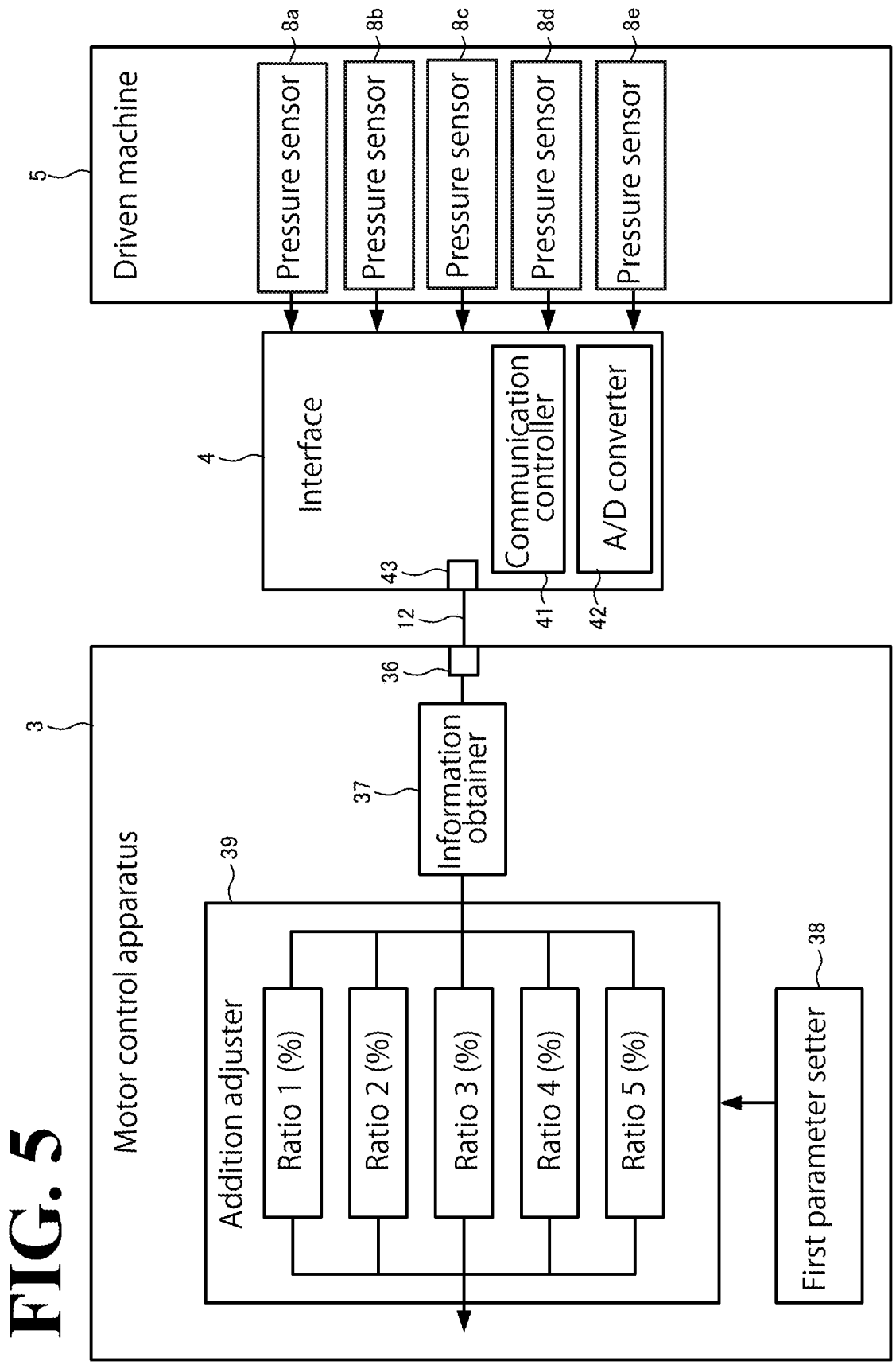
FIG. 5 is a diagram of a configuration of a motor control system according to a modification associated with addition processing of adding together pieces of information detected by a plurality of pressure sensors.

6-1. Adding Together Pieces of Information Detected by Plurality of Pressure Sensors In the above-described embodiment, a single pressure sensor is used to detect a piece of information. In a possible modification of the embodiment, a plurality of pressure sensors may be used to detect a plurality of pieces of information, and addition processing may be implemented to add together the plurality of pieces of information. By referring to FIG. 5, a functional configuration of the motor control apparatus 3 according to this modification will be described. Same reference numerals indicate same or similar features in FIGS. 1 to 3 and 5, and all or some of the features will not be elaborated upon here. In FIG. 5, the elements of the motor control apparatus 3 such as the pressure controller 341 and the current controller 342 are not illustrated for complication avoidance purposes.

This modification is particularly suitable for applications in which the driven machine 5 is a press machine or other machine that has a plurality of fulcrums. In this modification, a plurality of (in this embodiment, five) pressure sensors 8a to 8e are provided, each in one of the fulcrums of the driven machine 5. The interface 4 is connectable with a maximum of five pressure sensors so that the pressure sensors 8a to 8e send detected information to the interface 4. The interface 4, at the A/D converter 42, converts pieces of information detected by the pressure sensors 8a to 8e, which are analogue signals, into digital signals. At the same time, the interface 4 assigns identification information to each piece of information so as to make each piece of information identifiable as to which pressure sensor has detected the piece of information. Then, the interface 4 sends the piece of information to the motor control apparatus 3 through the second communication path 12.

The motor control apparatus 3 includes elements such as a first parameter setter 38 and an addition adjuster 39, in addition to the elements described in the above-described embodiment. The information obtainer 37 obtains, from among the information exchanged between the upper-level control apparatus 2 and the interface 4, a piece of information that is identifiable as to which of the pressure sensors 8a to 8e has detected the piece of information.

The first parameter setter 38 sets, as parameters, ratios of the pieces of information detected by the pressure sensors 8a to 8e. For example, the first parameter setter 38 sets ratio 1(%) as the ratio of the information detected by the pressure sensor 8a, ratio 2(%) as the ratio of the information detected by the pressure sensor 8b, ratio 3(%) as the ratio of the information detected by the pressure sensor 8c, ratio 4(%) as the ratio of the information detected by the pressure sensor 8d, and ratio 5(%) as the ratio of the information detected by the pressure sensor 8e. The sum of the ratios 1 to 5 is 100%.

The addition adjuster 39 adds together the pieces of information detected by the pressure sensors 8a to 8e based on the ratios 1 to 5 set by the first parameter setter 38. Then, the addition adjuster 39 outputs the sum of the pieces of information to the pressure controller 341 of the motor controller 34. The pressure control gain 341a of the pressure controller 341 receives an error between the pressure command sent from the upper-level control apparatus 2 (or the pressure command generator 349) and the sum of the pieces of information. Then, the pressure control gain 341a subjects the error to predetermined signal processing to generate and output a torque command.

With this modification, the user is able to set, as parameters, ratios of the values of the pressures detected by the pressure sensors 8a to 8e and obtained by the information obtainer 37. Thus, the user is able to readily set weighting to the values of the pressures detected by the pressure sensors 8a to 8e and obtained by the information obtainer 37. This configuration ensures more accurate pressure feedback control with respect to press machines and other machines that have a plurality of fulcrums.

6-2. Pressure Sensor is Provided with Integral Interface

In the above-described embodiment, the interface 4 and the pressure sensor 8 are separate structures. This configuration, however, is not intended in a limiting sense. For example, as illustrated in FIG. 6, which corresponds to FIG. 1, the pressure sensor 8 may include the interface 4 as a structure integral to the pressure sensor 8. This modification provides advantageous effects similar to advantageous effects provided in the above-described embodiment. Also in this modification, there is no section in which the information detected by the pressure sensor 8 is exchanged in the form of an analogue signal. This configuration helps minimize the influence of noise.

6-3. Other Notes

In the above description, the information for controlling the motor 6 is the pressure of the driven machine 5 detected by the pressure sensor 8. This configuration, however, is not intended in a limiting sense. Other possible examples of the information include, but are not limited to, the position (rotational angle) of the motor 6, the speed (angular velocity) of the motor 6, the torque of the motor 6, and the temperature of the motor 6. The pressure sensor 8 can detect any of these pieces of information in the manner described in the above embodiment.

Otherwise, the above-described embodiment and modifications may be combined in any manner deemed suitable.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A motor control system, comprising:
a motor;
a motor control apparatus configured to drive the motor and comprising a first communication port and a second communication port;
an upper-level control apparatus connected to the first communication port via a first communication path;
an interface circuit connected to the second communication port via a second communication path, the interface circuit including communication controller processing circuitry; and
at least one detector configured to detect information for controlling the motor and connected to or including the interface circuit,
wherein the motor control apparatus comprises motor control processing circuitry configured to obtain the information detected by the at least one detector and exchanged between the upper-level control apparatus and the interface circuit, and control the motor based on the obtained information,
wherein the at least one detector includes a plurality of detectors and the motor control processing circuitry of the motor control apparatus is further configured to set, as a parameter, a ratio among pieces of the information detected by the plurality of detectors, add together the pieces of the information according to the ratio, and control the motor based on the pieces of the information added together.

2. The motor control system according to claim 1, wherein the at least one detector includes a pressure detector configured to detect a pressure of a driven machine driven by the motor, and the processing circuitry of the motor control apparatus is further configured to control the motor based on a pressure command and the information detected by the pressure detector.

3. The motor control system according to claim 2, wherein the processing circuitry of the motor control apparatus is further configured to
control the motor based on a speed command and a speed information of the motor, control switching between speed control and pressure control, and set, as a parameter, a switching condition under which switching between the speed control and the pressure control is performed.

4. The motor control system according to claim 3, wherein the processing circuitry of the motor control apparatus is further configured to set, as parameters, a plurality of speed setting values and switching conditions respectively corresponding to the plurality of speed setting values, and generate the speed command based on at least one parameter among the set parameters.

5. The motor control system according to claim 3, wherein the processing circuitry of the motor control apparatus is further configured to set, as parameters, a plurality of pressure setting values and switching conditions respectively corresponding to the plurality of pressure setting values, and generate the pressure command based on at least one parameter among the set parameters.

6. A motor control apparatus for driving a motor, comprising:
a first communication port connected, via a first communication path, to an upper-level control apparatus;
a second communication port connected, via a second communication path, to an interface circuit that is connected to or included in at least one detector configured to detect information for controlling the motor, the interface circuit including communication controller processing circuitry; and motor control processing circuitry configured to obtain the information detected by the at least one detector and exchanged between the upper-level control apparatus and the interface circuit, and control the motor based on the obtained information, wherein the at least one detector includes a plurality of detectors and the motor control processing circuitry is further configured to set as a parameter, a ratio among pieces of the information detected by the plurality of detectors, add together the pieces of the information according to the ratio, and control the motor based on the pieces of the information added together.

7. A method for controlling a motor, comprising:
obtaining information for controlling a motor, and
controlling the motor based on the information,
wherein the information is detected by at least one detector and exchanged between an upper-level control apparatus and an interface circuit connected to or included in the at least one detector, the interface circuit including communication controller processing circuitry, and the method is executed by motor control processing circuitry of a motor control apparatus configured to control the motor, wherein the at least one detector includes a plurality of detectors and the motor control processing circuitry is further configured to set as a parameter, a ratio among pieces of the information detected by the plurality of detectors, add together the pieces of the information according to the ratio, and control the motor based on the pieces of the information added together.

8. The motor control system according to claim 1, wherein each of the plurality of detectors includes a pressure detector configured to detect a pressure of a driven machine driven by the motor, and the processing circuitry of the motor control apparatus is further configured to control the motor based on a pressure command and the information detected by the pressure detector.

9. The motor control system according to claim 8, wherein the processing circuitry of the motor control apparatus is further configured to control the motor based on a speed command and a speed information of the motor, control switching between speed control and pressure control, and set, as a parameter, a switching condition under which switching between the speed control and the pressure control is performed.

10. The motor control system according to claim 9, wherein the processing circuitry of the motor control apparatus is further configured to set, as parameters, a plurality of speed setting values and switching conditions respectively corresponding to the plurality of speed setting values, and generate the speed command based on at least one parameter among the set parameters.

11. The motor control system according to claim 4, wherein the processing circuitry of the motor control apparatus is further configured to set, as parameters, a plurality of pressure setting values and switching conditions respectively corresponding to the plurality of pressure setting values, and generate the pressure command based on at least one parameter among the set parameters.

12. The motor control system according to claim 9, wherein the processing circuitry of the motor control apparatus is further configured to set, as parameters, a plurality of pressure setting values and switching conditions respectively corresponding to the plurality of pressure setting values, and generate the pressure command based on at least one parameter among the set parameters.

13. The motor control system according to claim 10, wherein the processing circuitry of the motor control apparatus is further configured to set, as parameters, a plurality of pressure setting values and switching conditions respectively corresponding to the plurality of pressure setting values, and generate the pressure command based on at least one parameter among the set parameters.

14. The motor control system according to claim 1, wherein the information detected by the detector includes information corresponding to characteristics of the motor.

15. The motor control apparatus according to claim 6, wherein the information detected by the detector includes information corresponding to characteristics of the motor.

16. The method according to claim 7, wherein the information detected by the detector includes information corresponding to characteristics of the motor.

17. The motor control system according to claim 1, wherein the first and second communication ports are each external wired connections from the motor control apparatus.

18. The motor control system according to claim 1, wherein the motor control apparatus further includes second communication controller processing circuitry distinct from the communication controller processing circuitry.

* * * * *